United States Patent [19]
Leavitt

[11] Patent Number: 5,871,565
[45] Date of Patent: Feb. 16, 1999

[54] VACUUM/PRESSURE SWING ADSORPTION (VPSA) FOR PRODUCTION OF AN OXYGEN ENRICHED GAS

[75] Inventor: Frederick Wells Leavitt, Amherst, N.Y.

[73] Assignee: Praxair Technology, Inc., Danbury, Conn.

[21] Appl. No.: 783,081

[22] Filed: Jan. 15, 1997

[51] Int. Cl.$^6$ .................................................. B01D 53/053
[52] U.S. Cl. ........................... 95/100; 95/101; 95/102; 95/103; 95/105; 95/138
[58] Field of Search ...................... 95/95–98, 100–105, 95/138

[56] References Cited

U.S. PATENT DOCUMENTS

| | | | |
|---|---|---|---|
| 3,155,468 | 11/1964 | deMontgareuil et al. | 95/103 |
| 3,788,036 | 1/1974 | Lee et al. | 95/101 |
| 4,021,210 | 5/1977 | Streich et al. | 95/100 |
| 4,160,651 | 7/1979 | Pivard | 95/97 |
| 4,421,530 | 12/1983 | Dalton, Jr. et al. | 95/138 X |
| 4,461,630 | 7/1984 | Cassidy et al. | 95/100 |
| 4,468,237 | 8/1984 | Fuderer | 95/100 |
| 4,482,361 | 11/1984 | Whysall | 95/100 |
| 4,539,019 | 9/1985 | Koch | 95/96 X |
| 4,654,053 | 3/1987 | Sievers et al. | 95/138 |
| 4,685,939 | 8/1987 | Kratz et al. | 95/100 |
| 4,705,541 | 11/1987 | Sircar | 95/98 |
| 4,775,394 | 10/1988 | Yamano et al. | 95/101 |
| 4,816,039 | 3/1989 | Krishnamurthy et al. | 95/97 |
| 4,867,766 | 9/1989 | Campbell et al. | 55/161 |
| 4,915,711 | 4/1990 | Kumar | 95/138 X |
| 4,931,071 | 6/1990 | Kaplan et al. | 95/96 |
| 5,015,271 | 5/1991 | Reiss | 95/96 X |
| 5,126,466 | 6/1992 | Ramprasad et al. | 95/138 X |
| 5,296,105 | 3/1994 | Amatore et al. | 95/138 X |
| 5,370,728 | 12/1994 | LaSala et al. | 95/101 |
| 5,382,280 | 1/1995 | Choe et al. | 95/98 |
| 5,415,683 | 5/1995 | Leavitt | 95/101 |
| 5,518,526 | 5/1996 | Baksh et al. | 95/100 |
| 5,565,018 | 10/1996 | Baksh et al. | 95/100 |
| 5,620,501 | 4/1997 | Tamhankar et al. | 95/96 X |

FOREIGN PATENT DOCUMENTS

| | | | |
|---|---|---|---|
| 52-072841 | 6/1977 | Japan | 95/138 |
| 56-048243 | 5/1981 | Japan | 95/138 |
| 56-048244 | 5/1981 | Japan | 95/138 |
| 56-048246 | 5/1981 | Japan | 95/138 |
| 63-240914 | 10/1988 | Japan | 95/138 |

OTHER PUBLICATIONS

Accounts of Chemical Research, vol. 10, 1977, pp. 265–272, James P. Collman, "Synthetic Models for the Oxygen-Binding Hemoproteins".

Chemical Engineering Science, vol. 49, No. 1, 1994, pp. 51–60, D. M. Ruthven et al., "Concentration of a Trace Component By Pressure Swing Adsorption".

*Primary Examiner*—Robert Spitzer
*Attorney, Agent, or Firm*—Robert J. Follett

[57] ABSTRACT

This invention relates to a VPSA method for the production of a product that is enriched with a more preferred gas from a mixture of the more preferred gas and a less preferred gas and, preferably to a VPSA method for the production of an oxygen-enriched product from air, using an oxygen-preferential adsorbent under equilibrium conditions. In a preferred embodiment the process uses a desorption purge at a nearly constant pressure that is selected to produce a steady stream of oxygen having a purity from 30% to 60% at a pressure in the range of 60 kPa to 20 kPa.

30 Claims, 3 Drawing Sheets

VACUUM/PRESSURE SWING ADSORPTION (VPSA) FOR PRODUCTION OF AN OXYGEN ENRICHED GAS

FIELD OF THE INVENTION

This invention relates to a VPSA method for the production of a product that is enriched with a more preferred gas from a mixture of the more preferred gas and a less preferred gas and, more particularly, to a VPSA method for the production of an oxygen-enriched product from air, using an oxygen-preferential adsorbent under equilibrium conditions.

BACKGROUND OF THE ART

In VPSA processing, a feed gas mixture containing a more readily adsorbable component and a less readily adsorbable component is passed to an adsorbent bed capable of selectively adsorbing the more readily adsorbable component at a higher adsorption pressure. The bed is thereafter depressurized to a lower desorption pressure for desorption of the more readily adsorbable component and its removal from the bed, prior to repressurization and the introduction of additional quantities of the feed gas mixture to the bed, as cyclic adsorption desorption operations are continued in the bed.

Such VPSA processing is commonly carried out in multi-bed systems, with each bed employing the same VPSA processing sequence on a cyclic basis interrelated to the carrying out of such processing sequence in the other beds of the adsorption system. In VPSA systems for the separation of air, adsorbents have been employed that selectively adsorb nitrogen as the more readily adsorbable component, with oxygen being recovered as the less readily adsorbable component. Zeolitic molecular sieves, which operate on an equilibrium basis with a front of the selectively adsorbed nitrogen forming and advancing in the bed from the feed end to the product end thereof, are of this type and can be used in VPSA processing cycles for the production of either oxygen or nitrogen as the desired product. In the latter case, an oxygen enriched air stream is also recovered.

A low-cost method is needed to make low-purity oxygen at a steady rate from air. An example of useful low-purity oxygen is a gas stream containing 40% oxygen, which can be used as the oxidizer for a combustion process. Such a gas stream contains almost twice as much oxygen as does air and the ratio of nitrogen to oxygen is less than half as great as in air. Since there is less nitrogen for a given amount of oxygen, there is less combustion energy lost in heating the nitrogen. Also there is less flue gas to dispose of; the burner does not need to be as large; and a higher combustion temperature may be reached.

Typically, low-purity enriched oxygen is produced in two steps, by producing high-purity oxygen and then blending it with air to produce a stream of low-purity oxygen. An improved method for producing moderate amounts of enriched, low-purity oxygen is disclosed in U. S. Pat. Nos. 4,867,766 and Re 34,434 to Campbell et al. Therein, higher-purity oxygen (typically about 90 to 95 mol %) is produced by a pressure swing adsorption (PSA) system and the higher-purity oxygen is blended with air to produce a low-purity oxygen stream. Other, earlier methods for producing low-purity oxygen are mentioned therein as prior art which involve the blending of high-purity oxygen (typically at least 99.5 mol %) with air to produce the low-purity oxygen stream.

U.S. Pat. No. 5,382,280 to Choe et al. describes the use of an equilibrium-based, oxygen-selective adsorbent to remove oxygen from a gas stream in the second stage of a process for producing nitrogen from air. The adsorbent is described as having a Langmuir Type 1 shape, an infinite selectivity and accepts only about 1% to 5% oxygen in the feed. Choe et al. further teach a purge step that removes "any oxygen which may remain" in the unit. Such a thorough purge produces a rapid decline in the oxygen content of the effluent gas toward the end of the purge step.

Ruthven, et al. describe a pressure-swing process to concentrate hydrogen from a mixture with helium. See "Concentration of a trace Component by Pressure-Swing Adsorption", Ruthven, D. M. et al., Chemical Engineering Science (OXFORD) Vol. 49 No. 1, January 1994, pp. 51–60. The adsorbent used is zeolite 5A. The pressure-swing cycle runs at 77 K. The hydrogen isotherm is "well represented by the Langmuir expression". The adsorbent is highly selective for hydrogen over helium. Nevertheless, during the constant-pressure purge step, the hydrogen concentration in the effluent falls rapidly.

Neither Ruthven et al. nor Choe et al. illustrate a successful attempt to run a pressure-swing cycle with a desorption purge step that produces a steady stream of gas with a nearly-constant concentration of the more-strongly-adsorbed component.

Accordingly, it is an object of this invention to provide an improved method for the production of a preferred gas-enriched product from a mixture of the preferred gas and a less preferred gas.

It is another object of this invention to produce an oxygen enriched product without a need for first producing high-purity oxygen.

It is a further object of this invention to produce an oxygen enriched product by a process which avoids a blending step that generates entropy of mixing and thereby wastes energy.

It is yet another object of this invention to produce an oxygen enriched product with a process which produces a steady product stream directly from air in one adsorption cycle and can use compressors operating with low compression ratios.

SUMMARY OF THE INVENTION

A vacuum/pressure swing adsorption method for extracting a gas mixture enriched in a more preferred gas from a feed mixture of the more preferred gas and a less preferred gas, employs an adsorbent bed which, on an equilibrium basis, exhibits a selective adsorption preference for the more preferred gas. The method comprises the steps of:

1. passing the feed gas into the feed end of the adsorbent bed at a higher adsorption pressure that is about constant to allow the bed to adsorb oxygen from the feed gas while void gas is allowed to leave from the other end of the bed and part of that void gas is fed to a high pressure surge tank for later use during purge and product pressurization steps;

2: during a process depressurization step, the bed is depressurized by allowing gas to leave at one or both ends of the bed and some of the gas leaving the other end of the bed is fed to a low pressure surge tank for use as an oxygen-poor reflux gas and then some of the gas leaving from the feed end of the bed may be used as oxygen-enriched product gas or may be recompressed and recycled as a supplement to the feed gas fed to the feed end of one or more beds during later process steps;

3: during a process desorption step, oxygen-poor reflux gas from the low pressure surge tank flows into the other end of the bed to purge out some of the adsorbed oxygen while oxygen-rich product gas is allowed to leave from the feed end of the bed at a lower pressure that is about or nearly constant, or gradually declining;

4. During a process repressurization step, the bed is repressurized by allowing gas to enter at one or both ends of the bed where some reflux poor in the more preferred gas may be preferably fed from the high pressure surge tank into the output end of the bed and some feed gas may be fed into the feed end of the bed.

When the process is used to produce oxygen, the key is the use of desorption purge at a nearly constant pressure that is selected to produce a steady stream of low purity oxygen (30% to 60%), at a pressure in the range of 60 kPa to 20 kPa using oxygen-selective adsorbents. A further important feature of the invention is the use of an adsorbent that is appropriately oxygen-selective and is based on equilibrium selectivity, instead of rate selectivity. This feature allows use of low pressure ratios and low compression costs. A further feature of the invention is that properties of the preferred oxygen-selective adsorbents are matched in unexpected ways to the operating conditions of the separation process —as explained below in the section "Optimization and Selection of Adsorbents." We should note that by the term "nearly constant" we mean a level that is constant at least 50% percent of the feed adsorption or product desorption time.

DETAILED DESCRIPTION OF A PREFERRED EMBODIMENT

Figure 1:
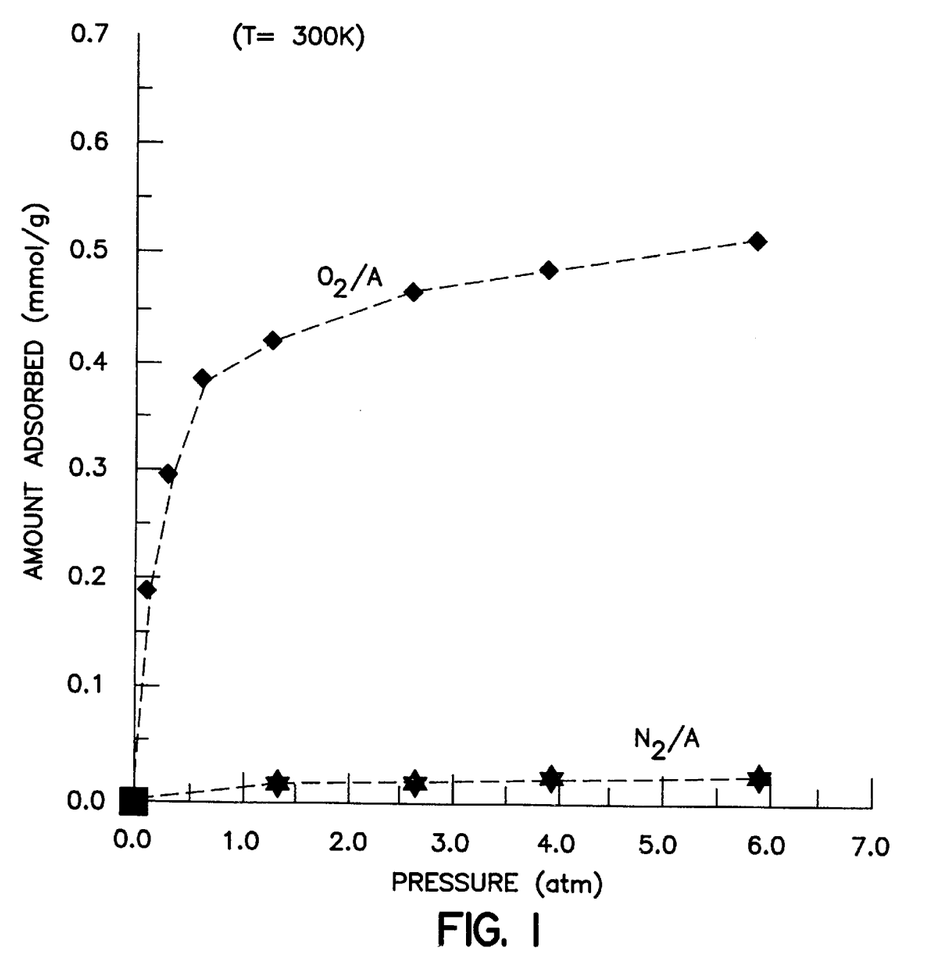
FIG. 1 is a plot of amount adsorbed versus pressure for an example adsorbent.

This invention incorporates a VPSA cycle using an $O_2$ equilibrium selective adsorbent, which produces an oxygen-enriched product. An adsorbent having an $O_2/N_2$ equilibrium selectivity and virtually no $O_2/N_2$ rate selectivity is used. The sorption property of an example $O_2$ equilibrium selective adsorbent (i.e., adsorbent A) is shown in FIG. 1, which plots amount adsorbed versus pressure, where:

Adsorbent A=BzIm/Co($T_{piv}$PP)/SP-SiO$_2$ $O_2$ equilibrium selective adsorbent A has a low $N_2$ sorption capacity and a high equilibrium selectivity ($O_2/N_2$). Adsorbent A is a supported transition element complex (TEC) composition including 1-benzylimidazole (bzIm) (17%), cobalt(II) picket fence porphyrin (as disclosed by Collman, *Accounts of Chemical Research*, 1977, vol 10, p265) and dense small particles of silica with a particle size of about 50 Angstroms (21 wt %). Coating is performed by chloroform evaporation under an inert atmosphere, using a solution of Bzim and Co($T_{piv}$PP). Further $O_2$ equilibrium selective adsorbents are described below. Specific examples of a range of compositions of Adsorbent A are contained in published European Patent Application EP 0711598 and in U.S. patent application, Ser. No. 08/339,872 entitled "Oxygen Selective Sorbents" and filed Nov. 14, 1994 (Attorney Docket D-20012) copending herewith and assigned to the same Assignee, the teachings of which are incorporated by reference herein.

As will be understood from the description below, the VPSA cycle of this invention employs two or more surge tanks and requires no bed-bed equalization step(s). Further, reflux gas is used for purging and product repressurization. Because the invention utilizes an $O_2$ equilibrium selective adsorbent and not a rate selective adsorbent such as a carbon molecular sieve (CMS), the disadvantages of CMS-based adsorbents in VPSA cycles are not encountered, since the $O_2$ selectivity over $N_2$ is independent of the adsorption time, i.e. the separation is based on equilibrium, not kinetics.

The $O_2$ equilibrium selective adsorbent can be exposed to high $O_2$ concentrations; consequently, the method of the invention does not require the use of CMS adsorbents for bulk removal of $O_2$. This is unlike prior art processes which use more than one adsorbent for the purpose of reducing adsorbent costs, or two stages to avoid exposing the $O_2$ equilibrium selective adsorbent to high $O_2$ concentration.

While the invention will hereafter be illustrated by describing the operation of a two bed VPSA system, it is to be understood that one bed, or more than two beds, can be employed using this invention. The VPSA cycle will be described with reference to FIGS. 2 and 3,.

The VPSA system (see FIG. 2) comprises two beds 10 and 12, each filled with adsorbent A, as described above. An air inlet conduit 14 provides feed air to a compressor 16 which, in turn, feeds compressed air to feed valves 18 and 20 and feed inlets 22 and 24, respectively. A pair of exhaust valves 26 and 28 connect feed inlets 22 and 24 to conduit 30, which is, in turn, coupled to a vacuum pump 32. Oxygen enriched product is provided via conduit 32.

Figure 2:
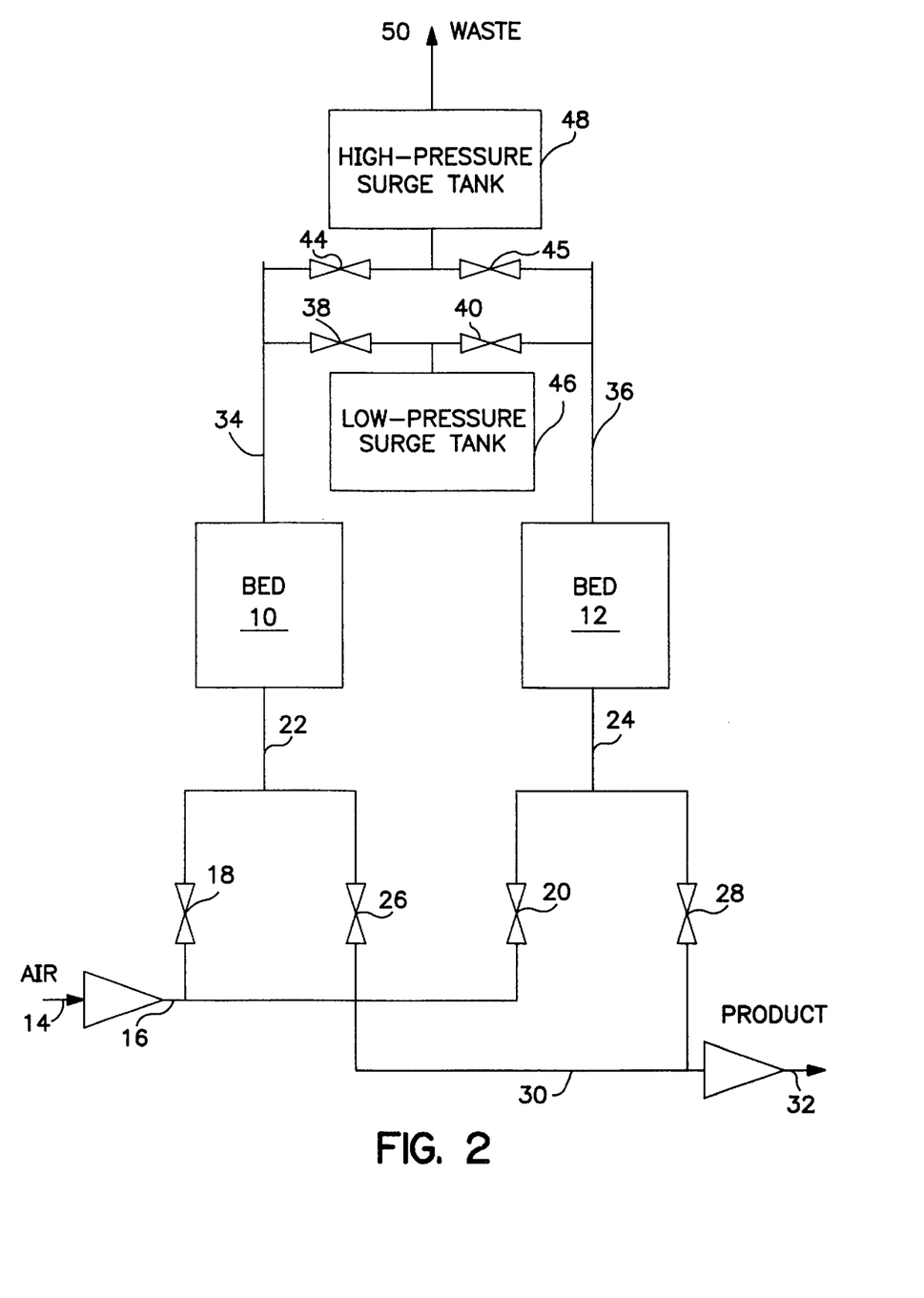
FIG. 2 is a schematic diagram of a VPSA system for carrying out the method of the invention.

Beds 10 and 12 include outlet conduits 34 and 36 which communicate, via valves 38 and 40, with the low pressure surge tank 46 and which also communicate, via valves 44 and 45, with the high pressure surge tank 48 and the waste outlet line 50. These conduits and valves allow high-pressure waste gas to flow from either bed to the two surge tanks and to the waste line 50. They also allow some of the waste gas to flow back from the surge tanks to either of the beds as lower-pressure reflux gas. All of the valves in FIG. 2 are operated electrically via a computer system and program logic (not shown).

Prior to describing the detailed operation of the system of FIG. 2, a brief overview of the VPSA process which incorporates the invention will be described. The invention produces low-purity oxygen from air by cycling one or more fixed beds of an oxygen-selective adsorbent through four process steps.

Step 1: During a process adsorption step, air is passed into the feed end of the adsorbent bed at a nearly constant higher pressure (preferably in a range of 80 kPa to 210 kPa and more preferably in a range of about 90 kPA to 130 kPa), while void gas is allowed to leave from an output end of the bed. As gas flows forward through the bed from the feed end to the output end, oxygen is preferentially adsorbed by the adsorbent. The gas stream is thus depleted in oxygen and enriched in other components, mainly nitrogen and argon. The void gas leaving at the output end of the bed contains less oxygen than the air that enters at the feed end of the bed. That void gas is fed to a high pressure surge tank for later use during purge and product pressurization steps.

Step 2: During a process depressurization step, the bed is depressurized by allowing gas to leave at one or both ends of the bed. Some gas leaves at the outlet end of the bed and is fed to a low pressure surge tank to be ultimately used as an oxygen-poor reflux gas for one or more beds. Some gas is allowed to leave from the feed end of the bed as oxygen-enriched gas. Some of this gas may be recompressed and recycled as a supplement to the air fed to the first end of one or more beds during later process steps. Some of it may be taken as a secondary product gas and combined with the primary product gas taken from beds during a process desorption step. Any of this gas not so used can be taken as waste. Some of the gas that leaves from the feed end of the bed in the depressurization step can be used to sweep air from the endspace at the feed end of the bed.

Step 3: During a process desorption step, oxygen-poor reflux gas from the low pressure surge tank flows into the output end of the bed, while product gas is allowed to leave from the feed end of the bed at a nearly constant or gradually declining lower pressure (i.e., from about 0.9 to 0.2 of the adsorption pressure and more preferably from about 0.7 to 0.3 of the adsorption pressure, depending on the desired oxygen concentration in the product.) As gas flows backward through the bed from the output end to the feed end, oxygen is desorbed from the bed into the gas stream. The gas stream is thus enriched in oxygen and leaves at a maximum concentration defined by the process pressures and other conditions and by the properties of the oxygen-selective adsorbent.

Since the product gas that leaves the bed during process desorption, and optionally during the last part of the process depressurization step, is at nearly constant pressure, the product compressor may be run at nearly constant suction pressure. That is advantageous for any type of compressor, especially for dynamic compressors such as centrifugal or axial compressors.

The low-pressure gas entering the bed at the second end during process step desorption and optionally during process step repressurization may have been passed through an expander (not shown in FIG. 2) to recover energy.

Step 4: During a process repressurization step, the bed is repressurized by allowing gas to enter at one or both ends of the bed. Some oxygen-poor reflux gas is preferably fed from the high pressure surge tank into the output end of the bed. Some air feed, is also allowed to enter at the feed end of the bed. The bed is thus pressurized from the final desorption pressure to an intermediate pressure in the range of 10 kPa above the desorption pressure to 10 kPa below the adsorption pressure and preferably about 50 kPa, and finally to the high pressure of about 105 kPa.

An important performance requirement of the process is that the maximum oxygen concentration (MO) be sufficiently high at pressure levels chosen for the process. A second desirable performance feature is that the actual oxygen concentration remain high while a large amount of primary product oxygen (PPO) is taken out of the feed end of the adsorbent bed in the primary product. Another desirable performance feature is for the flow amount ratio (FR) to be relatively small, preferably less than two and more preferably less than one. The FR is defined as the ratio of the amount of gas leaving a bed at the output end during the process depressurization step, to the amount needed as purge during the process desorption step. These three performance requirements are met simultaneously by using a best choice of adsorbent properties and process conditions.

Figure 3:
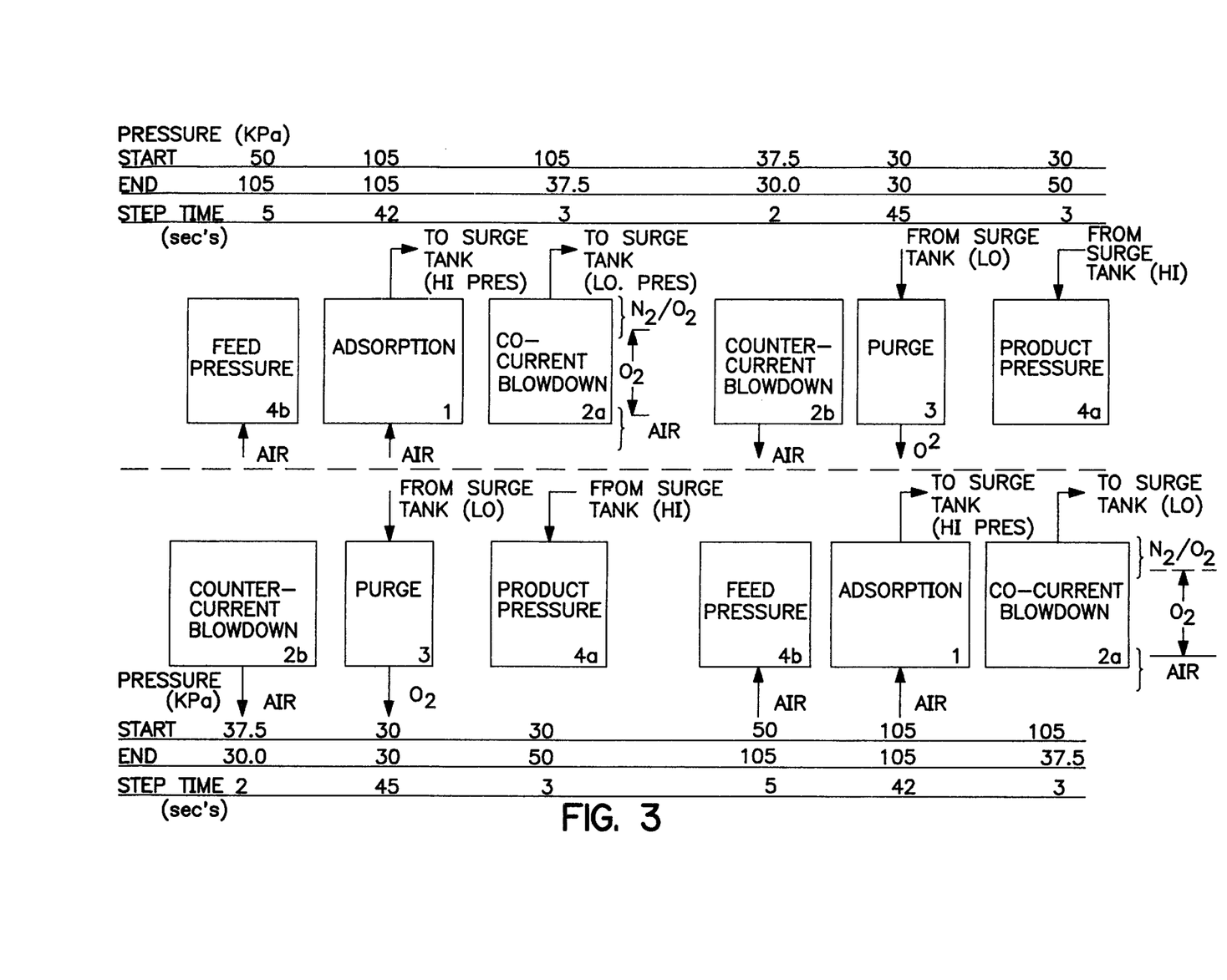
FIG. 3 schematically illustrates a two bed implementation of the process of the invention.

FIG. 3 shows an example of a two-bed implementation of the invention. Both beds are enabled to share the same surge tanks by offsetting in time the process steps that are performed by the respective beds. Further, the surge tanks decouple the beds with respect to their co-use of void gas from the surge tanks for reflux purposes.

In this example, a surge tank supplies purge gas for each bed during its process desorption step. It may also supply low-pressure pressurization gas for each bed during the early part of a process repressurization step while the bed pressure is still low. The surge tank receives gas from each bed during at least the first part of its depressurization step. It may also receive gas from each bed during its process adsorption step, if the additional gas is needed. Since the flows to and from the surge tank must balance, it is preferred that the flow into the surge tank from each bed during its process depressurization step be less than about twice the amount of gas needed for the purge.

The invention may be implemented with any number of beds. It is advantageous to arrange the implementation so that there is a nearly continuous flow of the oxygen-rich product. A preferred way to do that is to arrange the cycle steps so that there is always one and only one bed delivering product gas at any one time. This can be done provided that there are at least two beds.

Air usually contains strongly-adsorbed impurities such as water, carbon dioxide, and hydrocarbons. Any of these that would interfere with the operation of the oxygen-selective adsorbent should be removed from the air stream before it reaches the adsorbent. One way to remove impurities from the air stream is to use a pressure-swing adsorptive purification process based on adsorbents selective for the impurities. Part or all of the oxygen-enriched product from the invention can be used as a back-purge for the pressure-swing adsorptive purification process, if the impurities can be tolerated in the product stream. At least part of the pressure-swing adsorptive purification process can be built into the process of the invention by adding to the first end of each oxygen-selective adsorbent bed a layer of the adsorbents selective for the impurities.

Referring now to FIGS. 2 and 3, the two-bed VPSA process will be described in conformance with the steps described above. In the description, all valves are assumed to be operated so as to enable the recited flow.

Step 4b: Feed pressurization step.

Bed 10: Feed (air) is introduced at the feed end of bed to allow pressurization of bed 10 from an intermediate pressure of about 50 kPa to about 105 kPa.

Bed 12: During this time, bed 12 undergoes Step 2b (counter-current blowdown) and air is exhausted from the bottom void region of the bed.

Step 1: Adsorption step.

Bed 10: Feed air continues to be introduced at the feed end of the bed and upper void gas from the top of the bed is fed to high pressure surge tank 48 and to the waste line 50. Oxygen is adsorbed by the adsorbent in bed 10. The pressure in bed 10 remains at about 105 kPa during the entirety of this step, thereby enabling compressor 16 to operate against a constant pressure.

Bed 12: During this step, bed 12 is purged by enabling a product feed from the bottom of the bed to vacuum pump 32, while a feed of void gas enters the top of the bed from low pressure surge tank 46 (and, if necessary, from surge tank 48 also) and further forces down the product from the top of the bed.

Step 2a: Cocurrent blowdown step.

Bed 10: A flow of void gas from the output end of bed 10 is enabled into low pressure surge tank 46.

Bed 12: During this time, reflux gas is obtained from the high pressure surge tank 48 for product pressurization of bed 12.

Step 2b: Counter current blowdown step.

Bed 10: During this time, gas is exhausted from the feed end of bed 10.

Bed 12: Feed (air) is introduced at the feed end of bed 12 to allow pressurization of bed 12 from an intermediate pressure of about 50 kPa to about 105 kPa.

Step 3: Purge step.

Bed 10: During this step, bed 10 is purged by enabling a product feed from the bottom of the bed to vacuum pump 32, while a feed of void gas enters the top of the bed from low pressure surge tank 46 (and, if necessary, from high pressure surge tank 48 also) and further forces down the desorbed oxygen from the upper parts of the bed.

Bed 12: Feed air continues to be introduced at the feed end of the bed and upper void gas from the top of the bed is fed to high pressure surge tank 48. Oxygen is adsorbed by the adsorbent in bed 12. The pressure in bed 12 remains at about 105 kPa during the entirety of this step, thereby enabling compressor 16 to operate against a constant pressure.

Step 4a: Product pressurization step.

Bed 10: During this time, reflux gas is obtained from the high pressure surge tank 48 (and, if necessary, from low pressure surge tank 46 also) for product pressurization of bed 10.

Bed 12: A flow of void gas from the output end of bed 10 is enabled into low pressure surge tank 46.

The use of two or more surge tanks (in this case 46 and 48) allows for greater flexibility in the process. For example, the individual steps in the cycle shown in FIG. 3 do not have to occupy fixed periods of time. Thus, physical variables such as pressure and composition can be used to determine the time allocated for each step; thereby adjusting the process for changes in temperature, pressure and product demand. Since no bed-bed gas transfer is required, it is possible to run each bed independently, and to regard the process as a collection of single bed units. However, for proper sizing and sharing of compressor(s) and vacuum pump(s), some synchronization of the overall cycle of each bed with the cycles of the other beds is preferred. If necessary, more than two surge tanks can be used.

Optimization of Process Conditions

The higher pressure used in process adsorption step of the invention should be set to a level that will minimize cost. For most cases, that will be close to the local ambient pressure, adjusted to frictional pressure drops within the adsorbent beds and the connecting piping. The optimum pressure used in process adsorption step may be slightly higher than ambient if the feed air is compressed to overcome fractional pressure drops; it may be slightly lower than ambient if the waste is compressed to overcome frictional pressure drops. If feed air is supplied at another pressure, then it will usually be best to use that feed pressure for the higher pressure in process adsorption step.

For large beds, the temperature of any bed in the process adsorption step will normally be two to five degrees Celsius below that of the air feed.

The lower pressure, used in process desorption step, is set by the desired oxygen concentration in the oxygen-rich product and by the properties of the oxygen-selective adsorbent. When air is adsorbed at 105 kPa, effective adsorbents can give, for example:

53% oxygen at 30 kPa desorption pressure

31% oxygen at 60 kPa desorption pressure.

Oxygen-Selective Adsorbents

Adsorbent properties include the adsorption equilibria and thermodynamics, adsorption-desorption rates, and the relation between void space and adsorbent density. It is essential that the adsorbent be strongly oxygen-selective based on relative equilibrium loadings. Adsorbents basing their action on rate-selectivity are not useful in this invention. It is further important that the adsorbent have very little tendency to adsorb nitrogen. It is helpful for such adsorbents to have little tendency to adsorb argon.

An unexpected requirement is that the strength with which the adsorbent adsorbs oxygen must be in a specific range that is rather low. Modeling has shown that the strength with which the adsorbent holds oxygen needs to be matched to the process conditions in unexpected ways. Another unexpected relationship is that, when the strength with which the adsorbent holds oxygen is in the preferred range (as will be shown below), the maximum capacity of the adsorbent for oxygen may vary over a fairly wide range.

The oxygen-selective adsorbent must have properties that give a high MO and must also allow as high as possible a PPO for a given amount of the oxygen-selective adsorbent. This mainly requires that the oxygen-selective adsorbent have oxygen equilibrium loadings of the correct pattern while also having the important properties of low nitrogen loadings and a low ratio of void space to adsorbent mass.

Exemplary Adsorbent

As indicated above, an example of a suitable oxygen-selective adsorbent is:

BzIm/Co($T_{pi}$,PP) on silica (21 wt. % silica)

A Langmuir isotherm has been fitted to the given equilibrium oxygen loadings and the equation extended to other temperatures by taking the differential heat of adsorption as −13.1 kcal/mol (−54.8kJ/mol). Modeling results for the exemplary oxygen-selective adsorbent are shown in Table 1 below.

TABLE 1

| Higher (Adsorption) pressure | 105 kPa |
| --- | --- |
| Lower (Desorption) pressure | 30 kPa |
| Cocurrent blowdown pressure | 37.5 kPa |
| Adsorption Temperature | 260 to 320 K. |
| Heat of desorption | 54.8 kJ/mol |
| Maximum loading, LO | 0.52 mol/kg |
| Bulk density | 330 kg/m3 |
| Adsorbent density | 1490 kg/m3 |

| Partial pressure of oxygen in feed 22.0 kPa | | | |
| --- | --- | --- | --- |
| Adsorption Temp., K. | MO, Maximum oxygen mol fraction | PPO, Primary Product, mol oxygen/m³ | FR, Flow Ratio |
| 260 | 0.38 | 7.3 | 1.28 |
| 265 | 0.41 | 8.7 | 1.21 |
| 270 | 0.44 | 10.1 | 1.16 |
| 275 | 0.47 | 11.5 | 1.12 |
| 280 | 0.49 | 12.7 | 1.09 |
| 285 | 0.51 | 13.8 | 1.07 |
| 290 | 0.52 | 14.5 | 1.05 |
| 295 | 0.53 | 14.8 | 1.05 |
| 300 | 0.53 | 14.6 | 1.07 |
| 305 | 0.53 | 13.9 | 1.1 |
| 310 | 0.53 | 28.2 | 1.16 |
| 315 | 0.514 | 26.2 | 1.24 |
| 320 | 0.5 | 23.8 | 1.35 |

Adsorption temperature is the temperature reached in most parts of the bed near the end of the adsorption step. For this adsorbent, continued cycling in a large, nearly-adiabatic adsorbent bed may depress the adsorption temperature by as much as about three degrees K below the mean feed temperature.

MO is the maximum oxygen mol fraction reached in the oxygen-selective adsorbent bed as a result of the depressurization.

PPO is the maximum ratio of oxygen contained in the primary product to the volume of oxygen-selective adsorbent bed, mol/m$^3$.

FR is the minimum ratio of cocurrent blowdown gas to purge gas needed.

Optimization and Selection of Adsorbents

Oxygen-selective adsorbents typically have oxygen equilibria that are closely matched by Langmuir isotherms. The effect of Langmuir parameters on limiting process performance has been examined. For any given temperature there are three Langmuir parameters to consider:

1. Ph—The half-pressure, or partial pressure of oxygen that is in equilibrium with the adsorbed oxygen when half the available sites are occupied.
2. dH—The molar heat of adsorption.
3. LO—The maximum capacity for oxygen.

The first parameter is a measure of the strength with which the adsorbent adsorbs oxygen. The lower the half-pressure the more strongly the adsorbent holds oxygen.

The main process performance variables are:

1. MO —the maximum oxygen mol fraction reached in the oxygen-selective adsorbent bed as a result of the depressurization.
2. PPO —the maximum ratio of oxygen contained in the primary product to the volume of oxygen-selective adsorbent bed.
3. FR —the minimum ratio of cocurrent blowdown gas to purge gas needed.

For a given set of process conditions MO and PPO should be as high as possible whereas FR should be lower than unity. It has been found that as the Ph falls to near the partial pressure of oxygen in the feed gas (22 kPa), the MO rises to a peak of at least 0.529, while the PPO value rises to a peak above 15 mol/cubic meter of adsorbent bed. Simultaneously the FR flow ratio falls to a minimum below one. That allows use all of the cocurrent blowdown gas as purge gas instead of having to recompress it as waste.

The preferred range for the Ph is in the range from about 0.3 to about 0.8 times the partial pressure of oxygen in the feed gas. The most preferred range is from about 0.4 to about 0.7 times the partial pressure of oxygen in the feed gas. The theoretical upper limit for MO, based on zero decrease in the partial pressure of oxygen, is 0.7329.

As the Ph falls to near the partial pressure of oxygen in the feed gas, the MO rises to a peak of about 0.317, while the PPO value rises to a peak above 20 mol/cubic meter of adsorbent bed. Simultaneously the FR flow ratio falls to a minimum far below one, reaching a minimum near the same point where the other two variables reach their peaks. The preferred range for the Ph remains in the range from about 0.3 to about 0.8 times the partial pressure of oxygen in the feed gas. The most preferred range remains in the range from about 0.4 to about 0.7 times the partial pressure of oxygen in the feed gas.

The theoretical upper limit for MO, based on zero decrease in the partial pressure of oxygen, is 0.3664.

A large heat of desorption hurts performance as shown below in Table 2. Performance is compared for the best Ph value at the conditions given in Table 2. Note that the heat of desorption is the negative of the heat of adsorption.

TABLE 2

| | |
|---|---|
| Higher (Adsorption) pressure | 105 kPa |
| Lower (Desorption) pressure | 30 kPa |
| Cocurrent blowdown pressure | 37.5 kPa |
| Adsorption Temperature | 300 K. |
| Maximum loading, LO | 1.5 mol/kg |
| Bulk density | 330 kg/m3 |
| Adsorbent density | 1490 kg/m3 |

| Partial pressure of oxygen in feed 22.0 kPa | | | | |
|---|---|---|---|---|
| dH, Heat of oxygen desorption kJ/mol | Ph, Pa | MO, Maximum Oxygen mol fraction | PPO, Maximum Primary Product, mol oxygen/m3 | FR Flow Ratio |
| 83.7 | 12.7E3 | 0.53 | 15.2 | 0.95 |
| 124.7 | 12.7E3 | 0.46 | 9.9 | 1.07 |

The values of Ph were chosen to be near optimum for each level of heat of desorption.

The increase in the heat of oxygen desorption moved all three performance variables in the wrong directions. The heat of oxygen desorption acts to decrease the temperature during process steps 2 and 3. That adds to the cut in the partial pressure of oxygen during the period when we are trying to concentrate the oxygen in the primary product stream. It is preferred that the heat of oxygen desorption be less than about 150 kJ/mol and more preferred that it be less than about 100 kJ/mol.

As expected, performance increases with increased maximum loading, L0, but the trend is nonlinear. Tables 3 and 4 show the trends with L0 at two different desorption pressures (30 kPa and 60 kPa respectively).

TABLE 3

| | |
|---|---|
| Higher (Adsorption) pressure | 105 kPa |
| Lower (Desorption) pressure | 30 kPa |
| Cocurrent blowdown pressure | 37.5 kPa |
| Adsorption Temperature | 300 K. |
| Heat of desorption | 83.7 kJ/mol |
| Bulk density | 330 kg/m3 |
| Adsorbent density | 1490 kg/m3 |

| Partial pressure of oxygen in feed 22.0 kPa | | | | |
|---|---|---|---|---|
| LO, maximum loading, mol/kg | Ph, Pa | MO, Maximum oxygen mol fraction | PPO, Maximum primary product, mol oxygen/m3 | FR Flow ratio |
| 0 | | 0.21 | | |
| 0.1 | 12.7E3 | 0.39 | 5.6 | 1.68 |
| 0.75 | 12.7E3 | 0.51 | 12.8 | 1.04 |
| 1.5 | 12.7E3 | 0.53 | 15.2 | 0.95 |
| 3 | 12.7E3 | 0.54 | 17.9 | 0.87 |

The values of Ph were chosen to be near optimum for each level of L0.

TABLE 4

| | |
|---|---|
| Higher (Adsorption) pressure | 105 kPa |
| Lower (Desorption) pressure | 60 kPa |
| Cocurrent blowdown pressure | 64.5 kPa |
| Adsorption Temperature | 300 K. |
| Heat of desorption | 83.7 kJ/mol |
| Bulk density | 330 kg/m3 |
| Adsorbent density | 1490 kg/m3 |

TABLE 4-continued

Partial pressure of oxygen in feed 22.0 kPa

| LO, maximum loading, mol/kg | Ph, Pa | MO, Maximum Oxygen mol fraction | PPO, Maximum Primary Product, mol oxygen/m3 | FR Flow Ratio |
|---|---|---|---|---|
| 0 | | 0.21 | | |
| 0.1 | 12.7E3 | 0.27 | 7.4 | 0.5 |
| 0.75 | 12.7E3 | 0.31 | 16.9 | 0.27 |
| 1.5 | 12.7E3 | 0.32 | 20.4 | 0.24 |
| 3 | 12.7E3 | 0.32 | 24.5 | 0.2 |

The values of Ph were chosen to be near optimum for each level of L0.

Performance improves with increasing L0, rapidly at first but much more slowly at the higher values of L0. For each table, the MO value increases more in the first step than in the other three steps combined. For L0 in the range from 0.75 to 3.0 the increases in MO are small. Increases in PPO continue throughout the L0 range but at a declining ratio to L0. For each increase in L0, the ratio of the PPO value to the L0 value is much smaller; that implies that the amount of primary product oxygen per adsorption site declines sharply with increasing L0. Cost of the oxygen-selective adsorbents is likely to be nearly proportional to the value of L0.

The preferred range for L0 lies between about 0.1 and 3.0 mol/kg. A more preferred range lies between about 0.3 and 1.5 mol/kg.

As expected, performance increases with increased bulk density, BDEN, but the trend is unexpectedly nonlinear. Table 5 shows the trend with BDEN at a selected desorption pressure.

TABLE 5

| Higher (Adsorption) pressure | 105 kPa |
|---|---|
| Lower (Desorption) pressure | 30 kPa |
| Cocurrent blowdown pressure | 37.5 kPa |
| Adsorption Temperature | 300 K. |
| Heat of desorption | 83.7 kJ/mol |
| Maximum loading, LO | 1.5 mol/kg |
| Adsorbent density | 1490 kg/m3 |

Partial pressure of oxygen in feed 22.0 kPa

| BDEN, bulk density, kg/m3 | Ph, Pa | MO Maximum Oxygen mol fraction | PPO, Maximum Primary Product, mol oxygen/m3 | FR Flow Ratio |
|---|---|---|---|---|
| 0 | | 0.21 | | |
| 110 | 12.7E3 | 0.39 | 7.7 | 1.31 |
| 165 | 12.7E3 | 0.44 | 9.9 | 1.18 |
| 220 | 12.7E3 | 0.48 | 11.8 | 1.09 |
| 330 | 12.7E3 | 0.53 | 15.2 | 0.95 |

The values of Ph were chosen to be near optimum for each level of L0.

Performance improves with increasing BDEN, rapidly at first but more slowly at the higher values of BDEN. The nonlinearity is not as great as it is for L0 but it is distinct. For each table, the MO value increases more in the first step than in the other three steps combined. Increases in PPO continue throughout the BDEN range but at a declining ratio to BDEN. For each increase in BDEN, the ratio of the PPO value to the BDEN value is much smaller; that implies that the amount of primary product oxygen per adsorption site declines sharply with increasing BDEN. Cost of the oxygen-selective adsorbents is likely to be nearly proportional to the value of BDEN.

The preferred range for BDEN lies above about 110 kg/m3 and the more preferred range lies above about 330 kg/m3.

To keep adsorption and desorption rates high and adsorbent productivity high it is preferred to use particle sizes below about 2 mm and more preferred to keep them below 1 mm. For the same reason it is preferred to keep the total cycle time for the process below about 60 s and more preferably below about 30 s.

Operation with the adsorption pressure in the range of 80 kPa to about 210 kPa is preferred. Operation with the adsorption pressure in the range of 90 kPa to about 130 kPa is more preferred. The desorption pressure is preferred to be about 0.9 to about 0.2 times the adsorption pressure; it is more preferred to be about 0.7 to about 0.3 times the adsorption pressure.

An expander can be used to recover energy from the desorption purge feed and from the bed repressurization flow. Optionally, a regenerative section could be incorporated in the adsorbent beds to achieve enhanced energy recovery.

Two additional examples of $O_2$ selective adsorbents usable with the invention hereof are:

B) Co (3, 5-diBu$^r$salDAP)

C) Co{3,5-diBu$^r$sal/ (ETO) (CO$_2$Et)Hmal-DAP}

Transition element complexes B and C represent cobalt (II) complexes derived from dianions of bis(Schiff base) chelating ligands which posses four donor sites suitable for intramolecular coordination and one donor site constrained to serve intermolecularly. Specific examples of a range of compositions of B and C are contained in U.S. patent application, Ser. No. 08/784,175, entitled "Oxygen Selective Sorbents" and filed Jan. 15, 1997 (Attorney Docket D-20299) copending herewith and assigned to the same assignee, the teachings of which are incorporated by reference herein.

Complex B, abbreviated as Co(3,5-diBu$^r$salDAP), is the cobalt(II) form of the dianion of a chelating ligand derived formally from a Schiff base condensation between 3,4-diaminopyridine (DAP) and two equivalents of 3,5-di-tert-butylsalicylaldehyde (3,5-diBu$^r$sal).

Complex C, abbreviated as Co{3,5-diBu$^r$sal/(ETO) (CO$_2$Et)Hmal-DAP}, is the cobalt(II) complex of the dianion of a chelating ligand prepared formally by the 1:1 condensation of ethoxymethylene diethylmalonateand 3,4 diaminopyridine, followed by Schiff base condensation of the remaining primary amine group with 3,5-di-tert-butylsalicylaldehyde.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

I claim:

1. A vacuum/pressure swing adsorption (VPSA) method for extracting a gas mixture enriched in a more preferred gas from a feed gas mixture of said more preferred gas and a less preferred gas, said method employing one or more adsorbent beds each of which comprises an adsorbent which, on an equilibrium basis, exhibits a selective adsorption preference for said more preferred gas, said method comprising the steps of:

a) passing the feed gas mixture into a feed end of said one or more adsorbent beds at a higher adsorption pressure that is about constant, to allow said one or more adsorbent beds to adsorb the more preferred gas from the feed gas mixture while void gas is allowed to leave from a second end of said one or more adsorbent beds and part of that void gas is fed to a high pressure surge tank for later use during purge and product pressurization steps;

b) during a process depressurization step, depressurizing said one or more adsorbent beds by allowing gas to leave at one or both ends of said one or more adsorbent beds with some of the gas leaving said second end of said one or more adsorbent beds being fed to a low pressure surge tank for use as a reflux gas that is poor in said more preferred gas and some of the gas leaving from the feed end of said one or more adsorbent beds being used as product gas that is enriched in said more preferred gas or being recompressed and recycled as a supplement to the feed gas fed to the feed end of said one or more adsorbent beds during later process steps;

c) during a process desorption step, flowing said reflux gas that is poor in said more preferred gas from the low pressure surge tank into said another end of said one or more adsorbent beds to purge out some of the adsorbed more preferred gas while more of said product gas that is enriched in said more preferred gas is allowed to leave from the feed end of said one or more adsorbent beds at a lower pressure that is about constant or declining; and d) during a process repressurization step, repressurizing said one or more adsorbent beds by allowing gas to enter at one or both ends of said one or more adsorbent beds, where said reflux gas that is poor in said more preferred gas, is fed from the high pressure surge tank into the second end of said one or more adsorbent beds and where some of said feed gas mixture is fed into the feed end of said one or more adsorbent beds.

2. The VPSA method as recited in claim 1, wherein said more preferred gas in said feed gas mixture is oxygen.

3. The VPSA method as recited in claim 2, wherein said higher adsorption pressure is in a range of 80 kPa to 210 kPa.

4. The VPSA method as recited in claim 2, wherein said higher adsorption pressure is in a range of 90 kPa to 130 kPa.

5. The VPSA method as recited in claim 2, wherein said lower pressure is in range of 0.9 to 0.2 of said high pressure.

6. The VPSA method as recited in claim 2, wherein said lower pressure is in a range of 0.7 to 0.3 of said high pressure.

7. The VPSA method as recited in claim 2, wherein said adsorbent comprises an oxygen-selective adsorbent selected from the group comprising: Bzlm/Co($T_{piv}$PP)/SP–SiO$_2$; Co(3,5-diBu$^t$salDAP); and Co{3,5-diBu$^t$al/(ETO)(CO$_2$Et) Hmal-DAP}.

8. The VPSA method as recited in claim 2, wherein said feed gas mixture includes said oxygen at a partial pressure, and said adsorbent comprises an oxygen-selective adsorbent which exhibits a Ph of about 0.3 to 0:8 times the partial pressure of said oxygen in said feed gas mixture, where Ph=the partial pressure of oxygen that is in equilibrium with adsorbed oxygen, when half of the available adsorbing sites are occupied.

9. The VPSA method as recited in claim 2, wherein said feed gas mixture includes said oxygen at a partial pressure, and said adsorbent comprises an oxygen-selective adsorbent which exhibits a Ph of about 0.4 to 0.7 times the partial pressure of said oxygen in said feed gas mixture, where Ph=the partial pressure of oxygen that is in equilibrium with adsorbed oxygen, when half of the available adsorbing sites are occupied.

10. The VPSA method as recited in claim 2, wherein said adsorbent comprises an oxygen-selective adsorbent which exhibits a heat of oxygen desorption that is less than 150 kJ/mol.

11. The VPSA method as recited in claim 2, wherein said adsorbent comprises an oxygen-selective adsorbent which exhibits a heat of oxygen desorption that is less than 100 kJ/mol.

12. The VPSA method as recited in claim 2, wherein said adsorbent comprises an oxygen-selective adsorbent which exhibits a maximum capacity for oxygen of about 0.1 to 3.0 mol/kg.

13. The VPSA method as recited in claim 2, wherein said adsorbent comprises an oxygen-selective adsorbent which exhibits a maximum capacity for oxygen of about 0.3 to 1.5 mol/kg.

14. The VPSA method as recited in claim 2, wherein said adsorbent comprises an oxygen-selective adsorbent which exhibits a bulk density that is at least 110 kg/m$^3$.

15. A vacuum/pressure swing adsorption (VPSA) method for extracting a more preferred gas from a feed mixture of said more preferred gas and a less preferred gas, said method employing an adsorbent bed which, on an equilibrium basis, exhibits a selective adsorption preference for said more preferred gas, said method comprising the steps of:

a) pressurizing said adsorbent bed from an intermediate pressure to a high pressure with a flow of said feed mixture to enable said adsorbent bed to adsorb said more preferred gas and feeding void gas from said bed, during said pressurizing, to a first storage tank;

b) extracting and storing from said bed a further flow of said void gas into a second storage tank, while bringing said adsorbent bed to a low pressure;

c) desorbing, at about said low pressure, said more preferred gas from said adsorbent bed, while providing a feed of said void gas to said adsorbent bed from said second storage tank, said more preferred gas which is desorbed providing a product output; and d) feeding said void gas from said first storage tank to pressurize said adsorbent bed to about said intermediate pressure and repeating steps a–d.

16. The VPSA method re recited in claim 15, wherein said more preferred gas is oxygen.

17. The VPSA method as recited in claim 16, wherein said high pressure is in a range of 80 kPa to 210 kPa.

18. The VPSA method as recited in claim 16, wherein said high pressure is in a range of 90 kPa to 130 kPa.

19. The VPSA method as recited in claim 16, wherein said low pressure is in a range of 0.9 to 0.2 of said high pressure.

20. The VPSA method as recited in claim 16, wherein said low pressure is in a range of 0.7 to 0.3 of said high pressure.

21. The VPSA method as recited in claim 16, wherein said adsorbent comprises an oxygen-selective adsorbent selected from the group comprising: Bzlm/Co($T_{piv}$PP)/SP–SiO$_2$; Co(3,5-diBu$^t$salDAP); and Co{3,5-diBu$^t$sal/(ETO)(CO$_2$Et) Hmal-DAP}.

22. The VPSA method as recited in claim 16, wherein said feed gas mixture includes said oxygen at a partial pressure and said adsorbent comprises an oxygen-selective adsorbent which exhibits a Ph of about 0.3 to 0.8 times the partial pressure of said oxygen in said feed gas mixture, where Ph=the partial pressure of oxygen that is in equilibrium with adsorbed oxygen, when half of the available adsorbing sites are occupied.

23. The VPSA method as recited in claim 16, wherein said feed gas mixture includes said oxygen at a partial pressure, and said adsorbent comprises an oxygen-selective adsorbent which exhibits a Ph of about 0.4 to 0.7 times the partial pressure of said oxygen in said feed gas mixture, where Ph=the partial pressure of oxygen that is in equilibrium with adsorbed oxygen, when half of the available adsorbing sites are occupied.

24. The VPSA method as recited in claim 16, wherein said adsorbent comprises an oxygen-selective adsorbent which exhibits a heat of oxygen desorption that is less than 150 kJ/mol.

25. The VPSA method as recited in claim 16, wherein said adsorbent comprises an oxygen-selective adsorbent which exhibits a heat of oxygen desorption that is less than 100 kJ/mol.

26. The VPSA method as recited in claim 16, wherein said adsorbent comprises an oxygen-selective adsorbent which exhibits a maximum capacity for oxygen of about 0.1 to 3.0 mol/kg.

27. The VPSA method as recited in claim 16, wherein said adsorbent comprises an oxygen-selective adsorbent which exhibits a maximum capacity for oxygen of about 0.3 to 1.5 mol/kg.

28. The VPSA method as recited in claim 16, wherein said adsorbent comprises an oxygen-selective adsorbent which exhibits a bulk density that is at least 110 kg/m$^3$.

29. The VPSA method as recited in claim 16, wherein said method is performed using two adsorbent beds, both said adsorbent beds coupled to said first storage tank and said second storage tank, a first adsorbent bed practicing steps a, b, c and d while a second adsorbent bed substantially concurrently performs steps c, d a and b.

30. The VPSA method as recited in claim 16, wherein said high pressure in step a is substantially constant and said low pressure in step c is substantially constant.

* * * * *